March 4, 1969 A. DIETRICH 3,431,045
EYEGLASSES WITH ADJUSTABLE NOSE PADS
Filed Feb. 19, 1965

INVENTOR
ANTON DIETRICH
By McGlew and Toren
ATTORNEYS

United States Patent Office 3,431,045
Patented Mar. 4, 1969

3,431,045
EYEGLASSES WITH ADJUSTABLE NOSE PADS
Anton Dietrich, Munich, Germany, assignor to Optische Werke G. Rodenstock, Munich, Germany
Filed Feb. 19, 1965, Ser. No. 434,016
Claims priority, application Germany, Feb. 20, 1964, O 9,969; Jan. 9, 1965, O 10,593
U.S. Cl. 351—137          4 Claims
Int. Cl. G02c 5/12

ABSTRACT OF THE DISCLOSURE

A nose pad mounting construction for an eyeglass frame includes a carrier element, of deformable material which has a portion projecting from a surface of the nose pad and having walls defining a bore substantially parallel to the nose pad surface and extending along the pivot axis of the nose pad. A holder for securement to the eyeglass frame has a cap member loosely laterally embracing the carrier element, with the inner edge of the cap member being initially spaced from the surface of the nose pad. A bolt extends transversely through the cap member and, with substantial clearance, through the bore. The carrier element is selectively deformable by pressure applied between the nose pad and the outer end of the carrier element to expand its wall laterally into engagement with the inner surface of the cap member and to deform its outer wall inwardly against the bolt to engage the inner edge of the cap member with the nose pad.

Background of the invention

This invention relates in general to eyeglass construction, and in particular to a new and useful construction for the attachment of nose pads to eyeglass frames by means of a metallic holder.

The invention is particularly applicable to eyeglass frame construction in which the nose pads are made of plastic. It is known to arrange the nose pads so that they may be substantially universally movable in their mount, and it is preferable to mount the pads so that they are pivotal about a horizontal axis approximately parallel to the direction of sight. Equally frequently, however, the nose pads are arranged rigidly on their metallic holder, and the correct adaptation of the mounting to the nose form of the eyeglass wearer is effected by bending the holder.

In accordance with the invention, the nose pads are constructed so that they may be fitted to the mount in either a movable manner or rigidly. For this purpose, a part referred to as a hole carrier element or block element, having a relatively wide bore extending substantially parallel to the surface of the nose pad and extending approximately in the direction of the axis about which the pad is to be movable, is connected to the nose pad. The hole carrier element is constructed with sufficiently large anchor parts with which it is secured to the nose pad, and for this purpose the pad is advantageously made of a plastic which is extruded around a widened foot portion of the hole carrier element. The holder of the nose pad is constructed as a wire of round or similar cross section which carries a cap or cover element which covers a rounded or ball-shaped upper portion of the hole carrier element or extends around the sides of a block-shaped hole carrier element. The cap is large enough to be freely movable on the hole carrier with sufficient play. A bolt or screw element extends through the cap and through a hole or bore defined in the hole carrier element, the hole or bore of the hole carrier element being of much greater dimension or diameter than the diameter of the screw or bolt to permit the part to move freely with play and to permit deformation of the hole carrier area around the hole. In this manner, the hole carrier element with the nose pad is secured to the cap or cover member and bridge support. The construction is such that the attachment can be made rigid or fixed by compressing the parts in the oriented position to deform the hole carrier such that it becomes secured to the cap in a rigid clamped manner. For this purpose, the hole carrier element is provided with a head portion which extends through an opening defined in the cap. When the parts are secured together, the walls of the hole carrier element around the bore or hole therein are compressed and deformed so that the exterior walls thereof conform with the interior walls of the cap member and the cap member side portions are directed tightly against the nose pad. In the rigid position, the entire base surface or end walls of the semi-spherical or cylindrical cap member rest on the nose pad and the connection becomes rigid or fixed. A feature of the construction is that the parts may be altered from the movable state to the rigid fixed state by a simple operation, namely by the deformation of a structural part specifically designed for this purpose.

In accordance with another embodiment of this invention, the carrier element is made as a block-shaped or column-shaped element which is carried within a cap element which is in the form of an open-ended cylinder or loop. The open-ended cylinder cap element fits over the block-shaped portion of the hole carrier element and the bolt is directed through the cap member and through the large bore of the hole carrier in the manner of the previous embodiment. The hole carrier element is again deformed by exerting pressure thereon to cause movement of its outer edge toward the nose pad and to cause the deformation of the walls outwardly into tight engagement with the inner walls of the cylindrically-shaped cap member. In the final state, the cap member ends or edges rest against the nose pad to provide a fixed or rigid construction as in the other embodiment.

Accordingly, it is an object of this invention to provide an improved construction for the attachment of nose pads to eyeglass frames.

A further object of the invention is to provide a construction for the securement of a nose pad to an eyeglass frame with the initial association of the parts in a manner permitting relative movement of the nose pad in respect to the frame but with the parts being deformable so that they can be readily oriented in a fixed adjusted position after they are aligned in accordance with the preference of the wearer.

A further object of the invention is to provide an eyeglass construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 5:
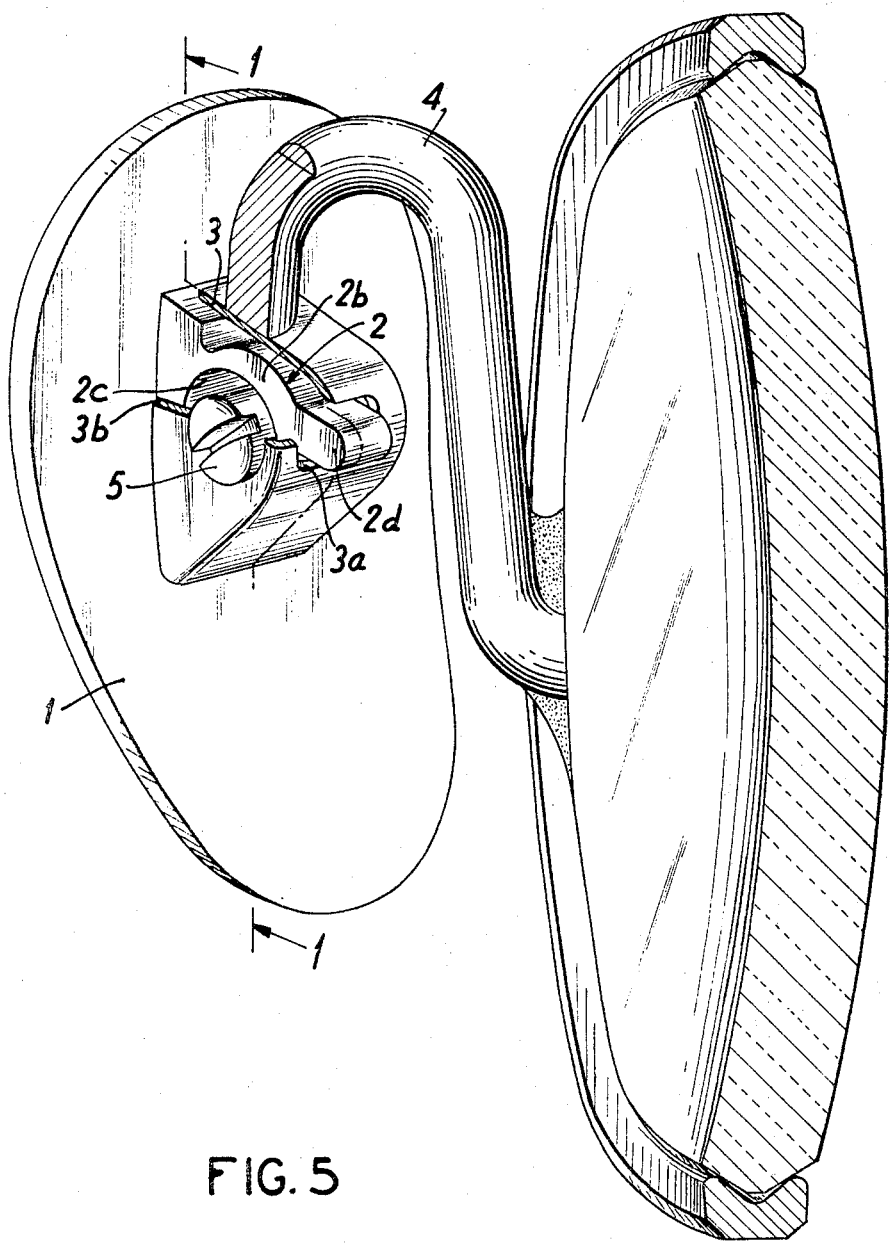
FIG. 5 is a perspective view, partly broken away and partly in section, illustrating a portion of an eyeglass construction having the nose pad mounting construction of the present invention.

Referring to the drawings, in particular, the invention embodied therein comprises a nose pad generally designated 1 which is advantageously made of a plastic which is extruded around a widened base or foot portion 2a of a hole carrier element generally designated 2. In accordance with the invention, the hole carrier generally designated 2 includes an upper or outer substantially spherical or ball-shaped portion 2b having a bore 2c defined therethrough. The hole carrier element 2 also includes an upper projection or head portion 2d which is arranged to extend through a bore or opening 3a in the top of a semi-spherical cap member or cover element generally designated 3, and which is generally bell-shaped and has a skirt portion surrounding portion 2b of hole carrier 2. The cap member 3 carries a holder 4 which is secured thereto, for example, by soldering. The holder 4 is connected at its other end to the eyeglass frame, as shown is FIG. 5.

A feature of the invention is that the bell-shaped member 3 may be placed over the ball-shaped portion 2b of the hole carrier element 2 and is dimensioned interiorly sufficiently large so that the parts may be relatively displaceable or movable with play. The cap 3 is held to the hole carrier element 2 by means of a screw or bolt element 5 which extends through the interior of the cap 3 and the bore 2c of the hole carrier element 2. As indicated in the drawings, the bore 2c of the hole carrier element 2 is made much larger than the diameter of the screw or bolt element 5.

Figure 1:
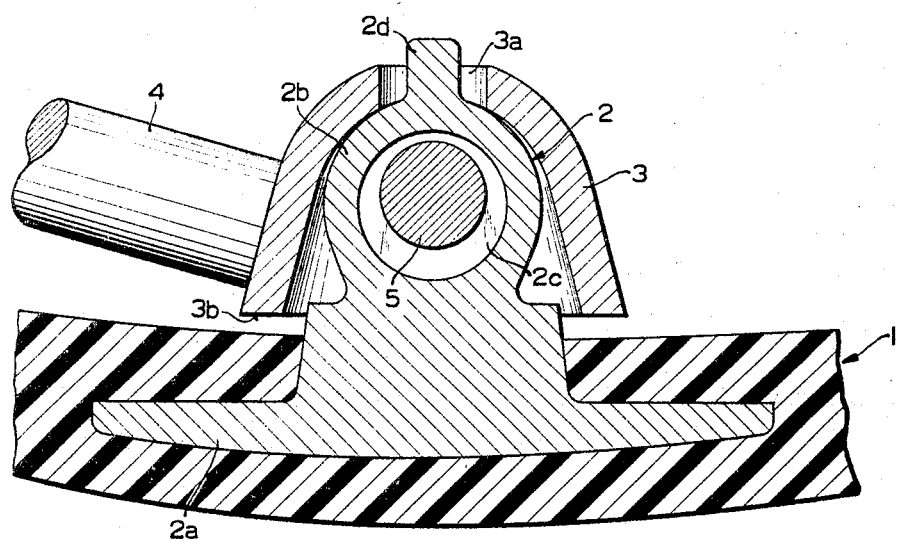
FIG. 1 is a partial transverse sectional view, taken on the line 1—1 of FIG. 5, of a portion of an eyeglass construction illustrating a nose pad mounting construction with the parts arranged in a movable state.
Figure 2:
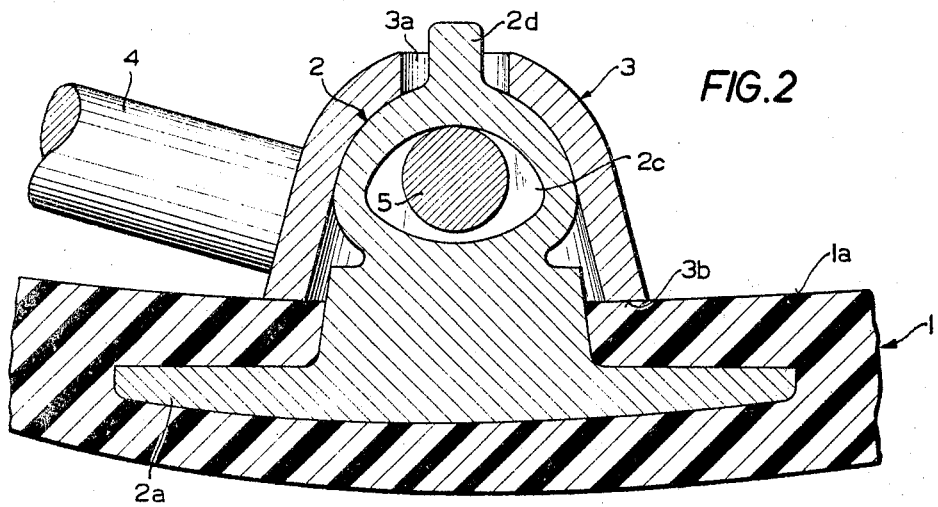
FIG. 2 is a view similar to FIG. 1 with the parts arranged in a fixed state.

A feature of the invention is that the parts may be oriented initially so that there is play between the cap 3 and the holder 4 on the one hand and the hole carrier element 2 and the holder 4 on the other hand, as indicated in FIG. 1, or the parts may be anchored in a fixed selected position, as indicated in FIG. 2. After the cap 3 is oriented in respect to the hole carrier 2, the parts may be anchored in a fixed position by exerting pressure such as by using pliers on the head portion 2d of the hole carrier 2 and around the nose pad 1 to deform the hole carrier 2 and cause the wall surrounding the bore 2c to become deformed into conforming engagement with the interior walls of the cap 3. When this occurs, the bottom surface 3b of the cap 3 will be displaced into tight engagement with the surface 1a of the nose pad 1. Since the cap 3 is not deformed by the deformation of the hole carrier 2, it is possible, after unscrewing the bolt element 5, to apply a new nose pad 1, with a new hole carrier element 2 and to make the connection with the eyeglass frame again as desired.

Figure 3:
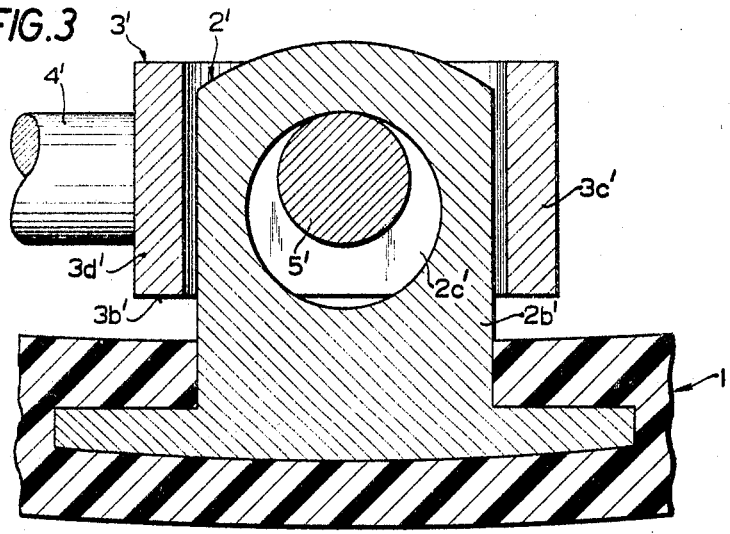
FIG. 3 is a view similar to FIG. 1 of another embodiment of the invention.
Figure 4:
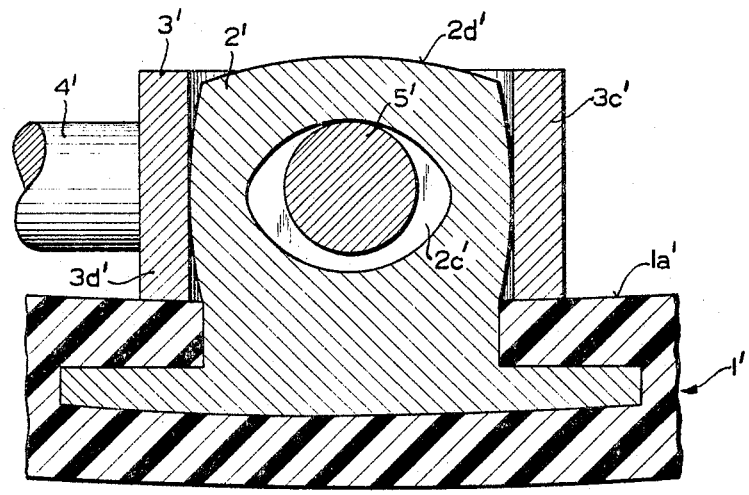
FIG. 4 is a view of the embodiment of FIG. 3 with the parts in a rigid state.

In the embodiment indicated in FIGS. 3 and 4, the parts are similarly designated but with a prime. In this embodiment, the cap or cover member generally designated 3' which is secured to the holder 4' is made as a substantially rectangular open-ended loop or of a shape such that it surrounds a rectangular cross-section upper portion 2b' of the hole carrier 2'. In this embodiment, the upper portion 2b' is made of a substantially block-shaped configuration with flat side walls opposed to end walls 3d' and 3c' of the cap member 3'. A bolt or screw member 5' extends through the cap member 3' and through a bore 2c' of larger diameter defined in the hole carrier 2'.

The movable or adjustable position of the parts indicated in FIG. 3 may be secured in a fixed position by applying a compressive pressure on the head portion 2d' of the hole carrier element 2' to deform the hole 2c' into a somewhat ellyptical configuration. At the same time, the bottom edge 3b' of the cap member 3' is moved into abutting relationship with the edge 1a' of the nose pad 1.

What is claimed is:

1. In an eyeglass construction including an eyeglass frame and a nose pad mounted on the frame for adjustment about a pivot axis, a nose pad mounting construction comprising, in combination, a hole carrier element, of deformable material, having a widened foot portion anchored in said nose pad and a portion projecting from said widened foot portion and from a surface of said nose pad, said projecting portion having walls defining a bore therethrough substantially parallel to said nose pad surface and extending along said pivot axis, a wire, for securement at one end to said frame, having a cap member at its opposite end including wall means loosely laterally embracing said projecting portion of said hole carrier element adjacent the bore in the latter, the inner edge of said wall means adjacent said nose pad surface being initially spaced from the latter, and a bolt element secured in said wall means of said cap member and extending through the hole carrier element and holding said hole carrier element in said cap member, the internal diameter of said bore being in excess of the diameter of said bolt element, the projecting portion of said hole carrier element being selectively deformable, by pressure applied transversely of said bore, between said nose pad and the outer end of said projecting portion, to expand its walls laterally into engagement with the inner surface of the wall means of said cap member, and to deform the outer portion of its walls inwardly against said bolt member to engage said inner edge of said wall means of said cap member with said surface of said nose pad.

2. In an eyeglass construction, a nose pad mounting construction arrangement, as claimed in claim 1, which said cap member is bell shaped and includes a skirt portion surrounding said projecting portion of said carrier element, said projecting portion of said carrier element having a projection at its outer end extending, with substantial clearance, through an aperture in the outer end wall of said cap member.

3. In an eyeglass construction, a nose pad mounting construction arangement, as claimed in claim 1, in which said projecting portion of said carrier member is substantially block-shaped.

4. In an eyeglass construction, a nose pad mounting construction arrangement, as claimed in claim 3, in which said cap member wall means comprises an open-ended substantially rectangular loop.

References Cited

UNITED STATES PATENTS 2,080,847   5/1937   Bouchard _____ 351—137

DAVID SCHONBERG, *Primary Examiner.*

J. W. LEONARD, *Assistant Examiner.*

U.S. Cl. X.R.

351—136, 138